July 23, 1957

P. N. MARTIN 2,800,579

COMBINED MANUAL AND AUTOMATIC ROUTE CONTROL
SYSTEM FOR RAILROADS

Filed July 9, 1954

INVENTOR.
Paul N. Martin.
BY
W. L. Stout
HIS ATTORNEY

INVENTOR.
Paul N. Martin.
BY
W. L. Stout
HIS ATTORNEY

INVENTOR.
Paul N. Martin.
BY W. L. Stout.
HIS ATTORNEY

Fig. 1H.

United States Patent Office 2,800,579
Patented July 23, 1957

2,800,579

COMBINED MANUAL AND AUTOMATIC ROUTE CONTROL SYSTEM FOR RAILROADS

Paul N. Martin, Wayne, Pa., assignor to Westinghouse Air Brake Company, Wilmerding, Pa., a corporation of Pennsylvania Application July 9, 1954, Serial No. 442,309

8 Claims. (Cl. 246—2)

My invention relates to a combined manual and automatic route control system for railroads, by means of which, at the will of an operator, certain traffic routes over the track switches of a manually controlable interlocking plant may be set up and the corresponding entering signals cleared automatically in accordance with the destination of approaching trains.

More particularly, my invention relates to the automatic control of switches and signals in an interlocking plant by a train describer system of the type adapted to automatically and successively display at a wayside station indications of the route, class, or destination of each of a series of trains which approach the station over the same stretch of railway track, and in which the indication of each train is cancelled upon its arrival at the station and then superseded by the indication for the next following train.

My invention is particularly adapted for use in connection with a train describer system of the type in which the route indications are both supplied and cancelled automatically by the action of route identifying marker devices on the approaching trains wthout dependence upon the track circuits for indicating the arrival or departure of such trains. The primary object of my invention is to provide the maximum protection against improper operation of the track switches and signals under conditions involving their automatic operation as a result of train movements, to thereby prevent the inadvertent misrouting of trains.

A specific object of my invention is to provide improved manual changeover transfer means for placing the switches and signals alternatively under manual control or under automatic control by a train describer system. This changeover means functions in such a manner as to insure that a shift to automatic control will be made only when no train is either approaching within a predetermined distance of the automatically controllable routes or is occupying one of these routes or a conflicting route.

A feature of my invention resides in the control of this changeover means so that the system automatically terminates the automatic control upon the approach of a train which is not identified by the train describer system, with the object of insuring that a route will not be set up for an unidentified train as the result, for example, of the storage in the train describer system of a route indication for a following train.

A further object of my invention resides in the control of the changeover means so that the system automatically terminates the automatic control if the identification of a train about to enter a route does not correspond with the identification of the train which is established when the train enters an approach zone in approach to the interlocking.

Certain of the features disclosed herein are disclosed and claimed in a copending application for Letters Patent of the United States Serial No. 238,799, filed on July 27, 1951, by Frank T. Pascoe, for Combined Manual and Automatic Route Control System for Railroads, and assigned to my assignee, and now U. S. Letters Patent 2,775,689, granted on December 25, 1956.

In the following, one form of apparatus embodying my invention will be described and the novel features thereof will then be pointed out in the claims.

Referring to the accompanying drawings.

Finally.

Similar reference characters refer to similar parts in each of the several views, and to simplify the circuit diagrams, only the terminals of the local sources of current for energizing the various relays are shown, these being identified by the reference characters B and N, respectively.

Figure 1A:
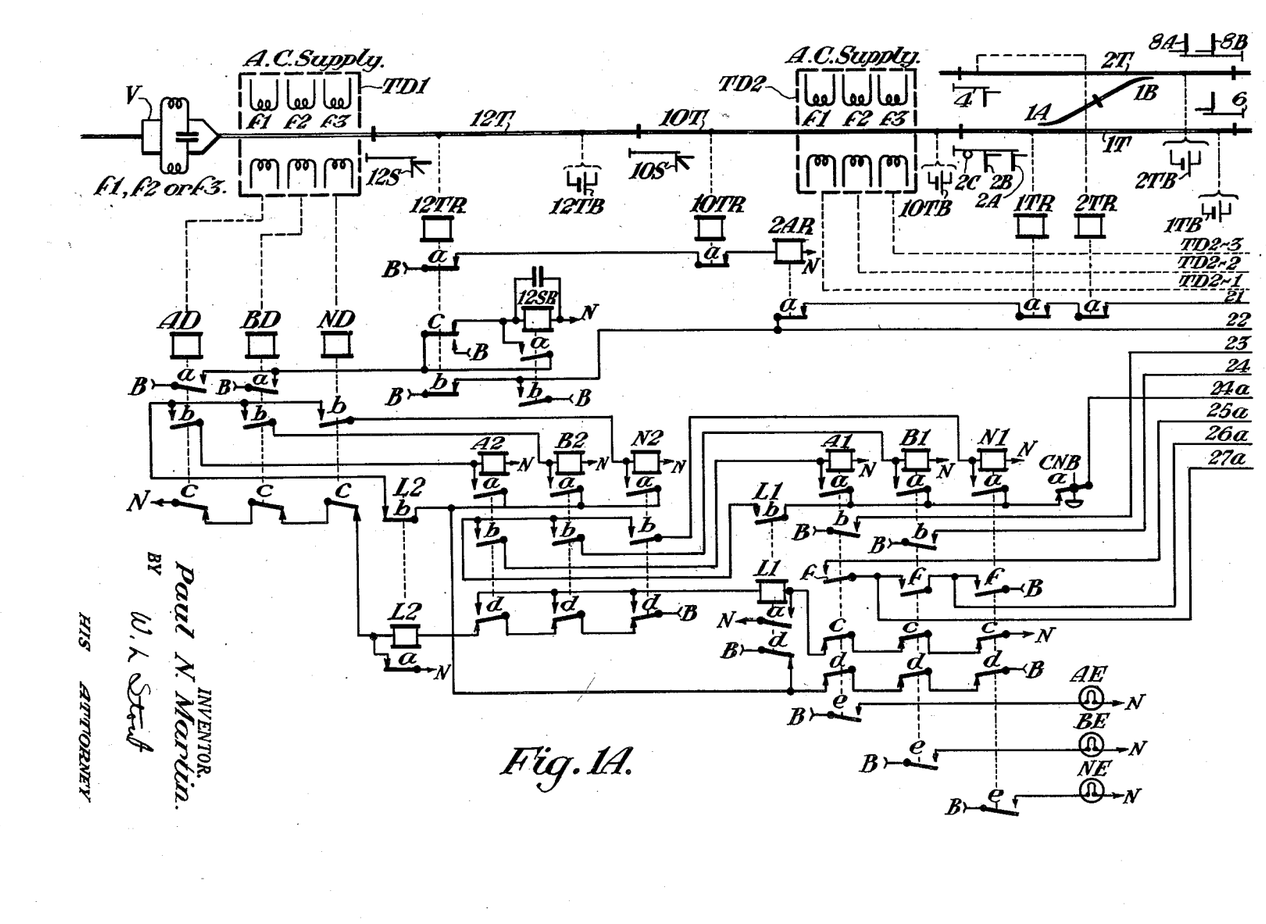
Fig. 1A shows a diagram of a stretch of railway track equipped with an interlocking control system arranged for automatic control by a train describer system, in accordance with my invention, together with the circuits and apparatus of the train describer system by means of which approaching trains automatically indicate their route, class or destination by the selective lighting of one of the lamps by a display indicator shown at the lower right in this view.

Referring to Fig. 1A, it is to be understood that the track plan shown is a portion of a stretch of railway track. In the plan, the rails are represented diagrammatically by a double line, and it is to be understood that the rails are divided by insulated joints to form a series of track sections, 1T, 2T, 10T and 12T, each of which is equipped with a normally closed direct current track circuit having a correspondingly numbered track relay TR supplied with energy over the rails of its section from a suitable track battery designated by the reference character TB prefixed with the number of the section.

To simplify the drawings, only the minimum amount of apparatus necessary to illustrate the principles of my invention is shown, and accordingly the interlocking plant shown is one having only a single crossover comprising a pair of power operated track switches 1A and 1B, and the train describer system is arranged to provide only two route indications. The various routes through the plant will be designated by the numbers which identify the signals at their opposite ends, as in Fig. 1C, and they include the routes 2—6, 2—8 and 4—8 having the entering signals 2A, 2B and 4, respectively, and the opposing routes 6—2, 8—2 and 8—4 for which the entering signals are 6, 8B and 8A, respectively. Of these, only the routes 2—6 and 2—8 are controllable automatically.

The approach zone for signals 2A and 2B comprises the track sections 10T and 12T, and its occupancy by a train is indicated in the conventional manner by the release of an approach relay 2AR controlled over front contacts a of track relays 12TR and 10TR for these sections.

Relay 2AR and the track relays 1TR and 2TR may control indication lamps on an illuminated track diagram, not shown herein, by means of which the positions and movements of trains are indicated in a control tower in accordance with the usual practice.

Figure 1B:
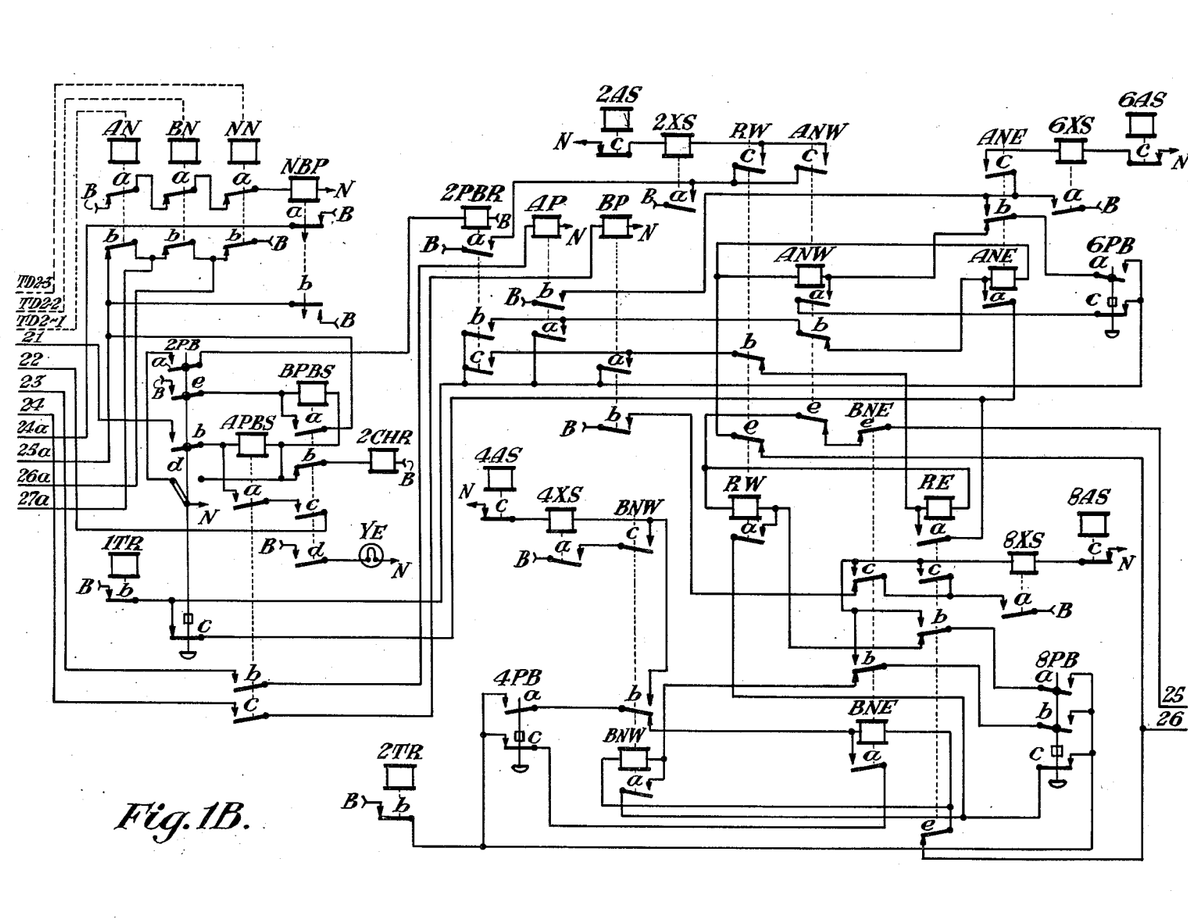
Fig. 1B shows circuits for the route selecting relays of an interlocking control system of the route type controllable by push buttons which designate the opposite ends of the different routes, with the circuits modified to include the changeover means of my invention together with relays governed thereby which enable the train describer system to automatically operate the selecting relays for certain routes.

Briefly described, the apparatus of my invention includes a manual changeover switch operable between two positions for designating manual and automatic control, respectively, which is incorporated in the route selecting push button 2PB, Fig. 1B, of the interlocking control system, together with a changeover or first auxiliary stick relay APBS which may be picked up to transfer the system from manual to automatic control by pressing the button 2PB when the changeover switch is in its automatic position, but only if the automatically controllable routes are unoccupied and the approach zone therefore is also unoccupied. The circuits incorporate the non-storage principle to insure that the transfer to automatic control will be made only under manual supervision and will not be made under any unsafe traffic conditions relative to the switch locking.

When relay APBS is energized, the route selecting relays of Fig. 1B by which routes 2—6 and 2—8 are established are controllable automatically by the repeating relays AP and BP, respectively, governed by the train describer system in accordance with the indicated route for the approaching train. When the automatic control is in effect, the manual control of non-conflicting routes is not interfered with, for example, route 4—8 or 8—4 may be set up manually, except when route 2—8 is set up.

In accordance with a feature of my invention, the changeover relay APBS is maintained energized either by the track relay 12TR for the entering section 12T of the approach zone, or by directional stick relay 12SR controlled by relay 12TR and the train describer system, in such a manner that the relay APBS releases to disable the automatic control on the approach of any train which fails to actuate the train describer system to register an indication of its route.

This is desirable for the reason that the route for any train which does not actuate the train describer system should be set up by manual control. If this is not done, the automatic control system would be in condition to be actuated by a following train upon entering the occupied approach zone to set up a route which, although established by the second train, could be accepted by the first train regardless of the wishes of the operator, with the result that he would lose control of that train. It will be clear that this difficulty is avoided by the automatic release of the changeover relay APBS in the event that a transfer from automatic to manual control, under the conditions described, has not already been made manually.

The apparatus also includes a second auxiliary stick relay, or cancellation stick relay, BPBS, which is governed jointly by the train described equipment and selective train identification apparatus located at the entrance to the automatically controllable route. In the previously referred to Pascoe application, the cancellation of the routes stored in the train describer system is accomplished by the picking up of a nonselective cancellation relay, operated by train identification equipment located at the entrance to the automatically controllable route. My invention provides a distinct improvement over the arrangement disclosed in the aforementioned Pascoe application, since I provide for the selective cancellation of train identity stored in the train described system. This feature is obtained by providing selective cancellation relays which are picked up momentarily as the train passes the second identification point, located just in the rear of the home signal governing movements over the automatically controllable route. If the operation of the cancellation relays is in accordance with the train description stored in the train describer system, the train description is cancelled and the apparatus is conditioned to enable a route to be set up automatically for any following train whose descriptions are stored in the train describer system. If the cancellation relay operation does not correspond to the identification of the train, suitable warning can be provided for either the engineman on the train, the interlocking operator, or both. This feature is accomplished by governing the second auxiliary relay BPBS by the train describer system and the cancellation relays in such manner that relay BPBS will be maintained picked up when the control apparatus is conditioned for automatic control only if the identities of the trains at the cancellation point correspond with the stored identity of the train in the train describer system. If relay BPBS releases due to a lack of correspondence in the train identities, it restores the circuits to their manual control condition and establishes suitable warnings.

Figure 1C:
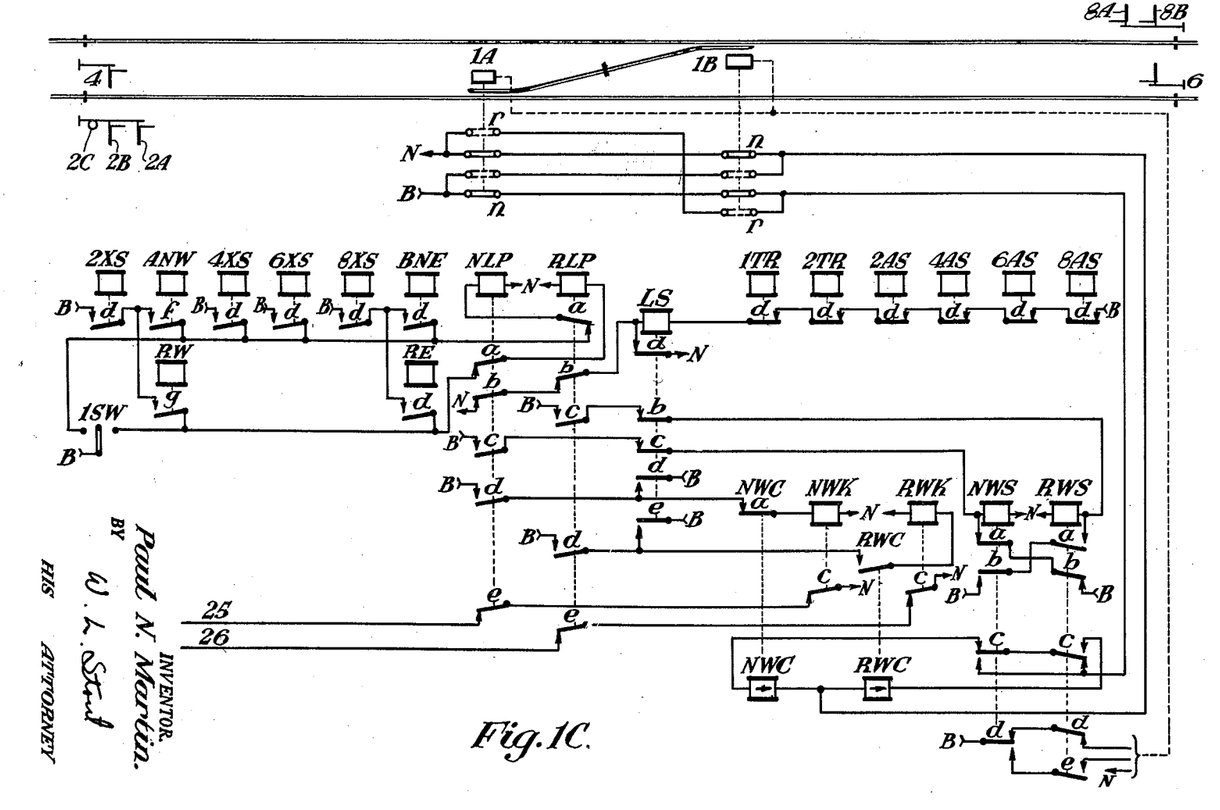
Fig. 1C shows a diagram of that portion of the track plan of Fig. 1A which includes the interlocked traffic routes, together with circuits and apparatus governed by the route selecting relays and by locking relays in accordance with signal and track conditions, for operating the interlocked track switches, and for indicating their position.
Figure 1D:
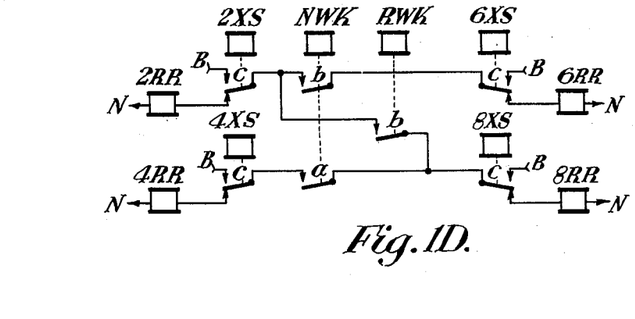
Fig. 1D shows circuits for route relays controlled by the route selecting and switch indication relays for governing the clearing of the signals.
Figure 1E:
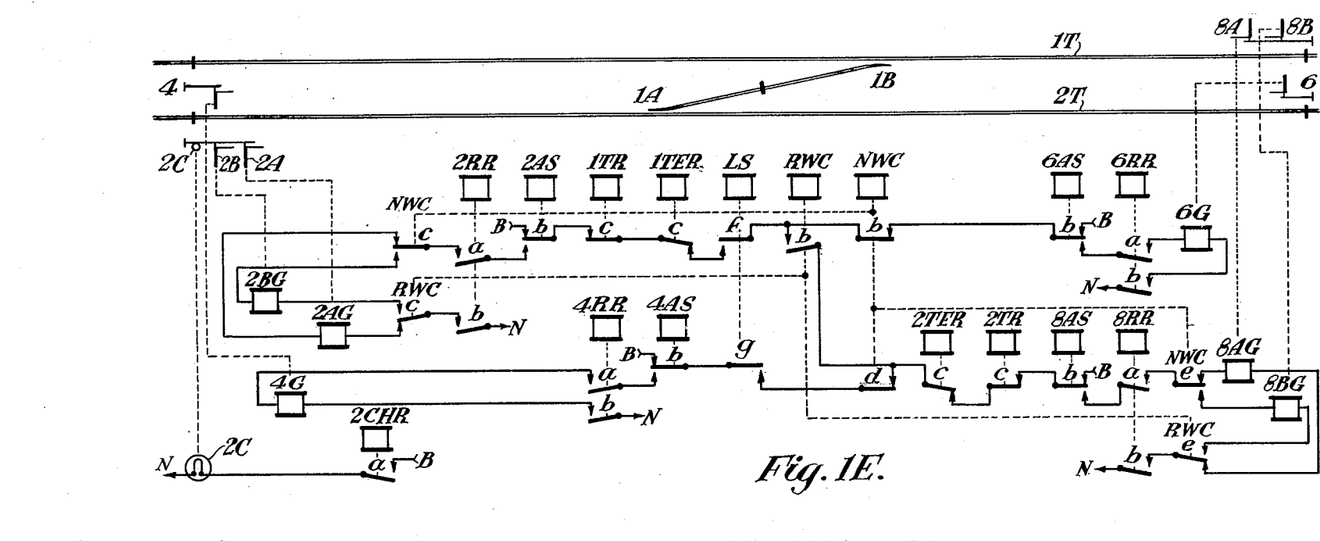
Fig. 1E shows circuits for the mechanisms for the entering signals for the interlocked traffic routes, together with a diagram of the same portion of the track plan as is shown in Fig. 1C.
Figure 1F:
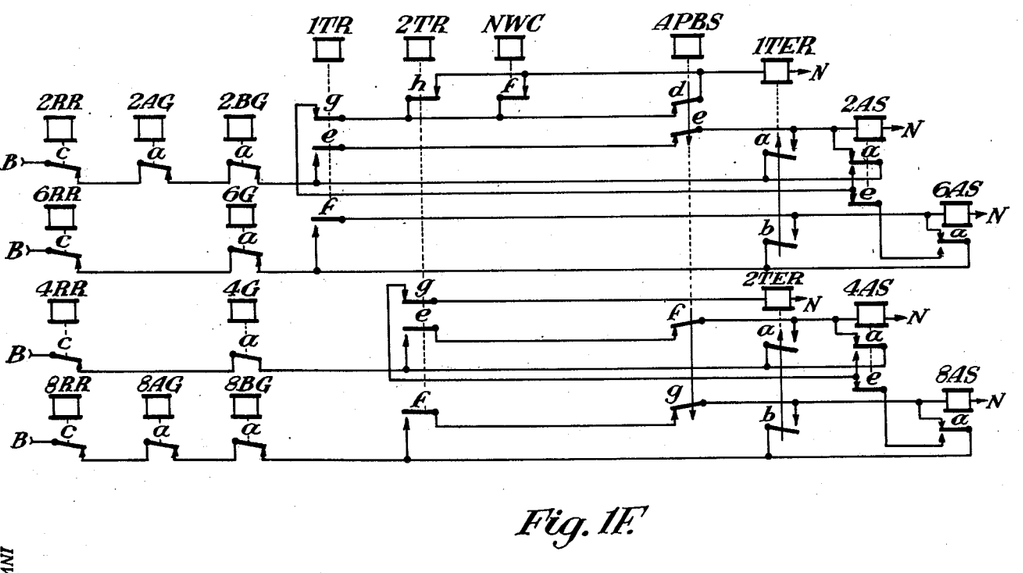
Fig. 1F shows circuits for approach and time locking relays controlled by the route relays and by the signals, by means of which the track switches and opposing signals are electrically interlocked.

In addition, relay APBS when energized opens the circuits in Fig. 1F by which otherwise an approach locking relay AS controlled by the entering signal would be reenergized automatically when a train enters an established route.

Under manual operation, although the release of the track relays for the switch sections is depended upon primarily to insure that the switches will remain locked until the route is vacated, additional protection is provided by incorporating the nonstorage principle in the switch control circuits. In accordance with this principle, if the control means is operated when the switches are locked, the result is merely to hold them locked, and the control means must be restored to its original condition and reoperated at a time when the switches of the route are not locked in order to effect their operation. In order to provide a corresponding measure of additional protection under automatic operation, the circuits are arranged to maintain the switch locking effective, after a route has been occupied, until it is certain that it has been vacated as manifested by the fact that the track relay has remained steadily energized for a predetermined time locking period during which the track relay for each section of the route is steadily energized.

Before describing the operation of the apparatus of my invention in detail, the block signaling system, the train describer system and the interlocking control system will each be briefly described, for the reason that knowledge of the general mode of operation of these systems is deemed necessary for an understanding of my invention.

Considering first the signaling system, it is to be understood that the wayside automatic signals 10S and 12S may be governed in any of the conventional manners well known in the railway signaling art, so that each of these signals will display a red or stop aspect when the track section immediately in advance of a section is occupied, will display a yellow or approach aspect when the first section in advance of a sginal is unoccupied but the next signal in advance is displaying a stop aspect, and will display a green or clear aspect when the first section in advance of a signal is unoccupied and the next signal is displaying an aspect less restrictive than stop. The detailed circuits for the control of signals 10S and 12S are not shown, in order to simplify the drawings.

The train describing system employed in connection with my invention, as shown in Fig. 1A, includes two similar train reporting devices TD1 and TD2 controllable by train-carried marker coils and located respectively at the entrance to the approach zone and at the entrance to the interlocking plant, in the rear of signal 2A, together with a storage indicator of the multiple unit type controlled thereby, which comprises a plurality of cascade-connected units adapted to store indications of the route, class or destination of the trains for display in the order of their passage through the approach zone. This train describer system is of the type disclosed and claimed in Letters Patent of the United States No. 2,670,434, granted on February 23, 1954, to Henry J. Groenendale for Train Describer System.

In addition to its use for automatic route control purposes, an important function of the train describer system is to selectively light one of a plurality of lamps AE, BE, etc., to visually indicate the route, class or destination of an approaching train or the approach of an unclassified train. These indications may be displayed in the control tower for the guidance of an operator in setting up routes manually and also may be displayed on a passenger station platform for the information of the public. The lighting of lamp AE indicates that the approaching train is to take route 2—6; the lighting of lamp BE indicates it is for route 2—8; while the lighting of lamp NE indicates the approach of an unclassified train, that is to say, one for which the route is not specified and which route must be set up by manual control. In addition, the train describer system permits work trains or the like which are not equipped with marker coils to move into or out of the approach zone without interference with the displayed indication. The relative length of the approach zone with reference to the length in spacing of trains is assumed to be such that there is no more than two trains in the approach zone at the same time, and accordingly the storage indicator as shown comprises only two storage units. The first of these governs the display of indications by the lamps AE, BE and NE and comprises a lockout relay L1 and a plurality of indication storage relays A1, B1 and N1, of which one is provided for each indication to be displayed. The second storage unit comprises the similar relays L2, A2, B2 and N2 and provides means for temporarily storing the indication for a second train which enters the approach zone at a time when the first unit is displaying the indication for a preceding train.

Any suitable arrangement of storage relays may be used, but the storage indicator shown herein is of the type disclosed and claimed in Letters Patent of the United States No. 2,171,756, granted September 5, 1939, to Lloyd V. Lewis.

The train reporting devices TD1 and TD2 may be of any suitable type, but as shown herein these correspond, in principle, to what is disclosed and claimed in a copending application for Letters Patent of the United States, Serial No. 213,776, filed March 3, 1951, by Richard W. Treharne, Jr., for Vehicle Reporting Systems, now U. S. Letters Patent 2,753,550, granted July 3, 1956.

Each train reporting device includes a plurality of primary windings continuously supplied with alternating current of a distinctive frequency $f1$, $f2$ or $f3$, which identifies the indication to be displayed by the corresponding one of the lamps AE, BE and NE. Each primary winding has an associated secondary winding to which it is effectively coupled when and only when a train-carried coil tuned to resonance at the corresponding frequency is interposed, or at least is brought into proximity with the corresponding pair of windings. Under this condition a detector relay AD, BD or ND is operated by energy supplied by the corresponding secondary winding. It will be evident, therefore, that when a train or vehicle V which is equipped with a coil tuned to resonance at any one of the frequencies $f1$, $f2$ or $f3$ passes the reporting device TD1, the corresponding detector relay AD, BD or ND will be momentarily and selectively energized.

The train reporting device TD2 is similar to TD1, and is arranged so that one of the three cancellation detector relays AN, BN or NN, shown in Fig. 1B, is operated by energy supplied by the corresponding secondary windings when a train-carried coil tuned to the corresponding frequencies $f1$ $f2$ or $f3$ passes the location of the windings of the train reporting device TD2, shown in Fig. 1A.

When a vehicle equipped with a marker coil passes the reporting device TD1, a distinctive indication is registered by relay AD, BD or ND and is stored by energizing the corresponding relay of the second unit until the first unit is available, and then is transferred to the corresponding relay of the first unit, which stores the indication until the train passes the second reporting device TD2 and the indication is then cancelled by the operation of one of relays AN, BN and NN.

The indication may also be cancelled by the operation of an emergency or cancellation key CNB.

The train identification received by the train reporting device TD1 is stored in the following manner, provided the second storage unit is available with relays A2, B2 and N2 released, and relay L2 energized as shown. The operated detector relay AD, BD and ND energizes, over contact $b$ of relay L2, the corresponding one of the storage relays A2, B2 or N2, which relay is held energized over a stick circuit and its contact $d$ assumes it upper position, releasing relay 12, and if relays A1, B1 and N1 of the first unit are released, energizing relay L1. The energized relay A2, B2 or N2 then energizes, over contact $b$ of relay L1, a corresponding storage relay A1, B1 or N1 of the first unit which by closing its contact $e$ lights the corresponding lamp AE, BE or NE, and at its contact $a$ stick circuit which holds the relay energized until the stick circuit is opened by the corresponding train on passing the reporting device TD2, by operation of the cancellation relays AN, BN or NN, and the subsequent release of slow release cancellation repeating relay NBP.

The stick circuits for storage relays A2, B2 and N2 of the second storage unit have two connections to terminal B of the local source of energy, one of which includes back contact $d$ of relay L1, which is now open, and the other of which includes back contacts $d$ of relays A1, B1 and N1. The latter connection is opened when one of these relays picks up to release the energized storage relay A2, B2 or N2, which in turn releases relay L1 and energizes relay L2. This renders the second unit available for the reception of an indication of a second train from the reporting device TD1 where it will be stored until the first storage unit is again rendered available.

Heretofore, train described systems as used commercially have been arranged to count train movements by the occupancy of certain track circuits to insure that at least one and only one indication will be stored or cancelled for each train passage. This arrangement presents the practical difficulty that close manual supervision is required to properly correlate the stored indications with the corresponding trains due to the occasional occupancy of a controlling track section by unidentified or unclassified trains, or due to switching movements involving the repeated occupancy of the track section at one end only of the controlled territory, or in the event a second train enters a controlling track section before it is vacated by the first train.

These difficulties are avoided in the train describer system shown because its operation is wholly independent of track circuit conditions. In consequence, the system is nonresponsive to regular train movements or to the passage of extra trains unless this is desired, in which case the system is readily made responsive by the provision of suitably tuned coils on such trains, and the system is particularly well adapted to automatic operation because the usual provisions for correcting errors in the transmitted indications due to such irregular train movements are not needed. The fact that the train describer system is independent of track circuit operation presents a difficulty when the system is applied to automatic route control which has already been referred to, and which is overcome, as has already been explained, by controlling the changeover relay, or first auxiliary relay, APBS in such a manner that the automatic route control remains effective only as long as each approaching train registers a route indication and thereby operates a directional stick relay 12SR, and by the correspondence check afforded by the provision of the second auxiliary relay BPBS.

The interlocking control system shown in Figs. 1B to 1F, inclusive, is of the route type and corresponds generally to the system disclosed and claimed in Letters Patent of the United States No. 2,301,297, granted November 10, 1942, to Lloyd V. Lewis. In this system, the routes are set up and their entering signals cleared by the operation of the push buttons PB shown in Fig. 1B, which designate the opposite ends of the routes.

The push button 2PB, shown in Fig. 1B, for the entrance end of the automatically controllable routes, is arranged in accordance with the requirements of my invention to include a rotatable contact d for conditioning the system for manual or automatic control, in addition to the usual push contacts, a, b and e, and a pull contact c. In the manual control position, the button 2PB controls the associated selecting relays by the operation of a repeating relay 2PBR over its contacts a and d, and its function is similar to those of the other push buttons.

The circuits for the selecting relays of Fig. 1B are connected to terminal B of the local source of current over front contact b of track relay 1TR of 2TR for the track section at the entering end of the corresponding route, and to terminal N of the same source over wires 25 and 26 and back contacts of the switch control and indication relays of Fig. 1C, as hereinafter traced in detail.

For a general understanding of the mode of operation it will suffice to point out that, when the system is in the condition shown, the pressing of button 2PB operates relay 2PBR and thereby energizes the selecting relays ANE and RE for the diverging routes 2—6 and 2—8, button 4PB controls the selecting relay BNE for route 4—8, button 6PB controls the selecting relay ANW for route 6—2, and button 8PB controls the selecting relays RW and BNW for the diverging routes 8—2 and 8—4.

Each selecting relay when operated is held energized over a stick circuit including its own front contact a, the pull contact of the associated push button, and contact b of the track relay 1TR or 2TR for the track section at the entrance end of the route. The operation of the selecting relay for either of two converging routes prevents the operation of the other by the opening of its back contact e, as shown for relays RE and BNE, and also for the similar relays RW and ANW. Each operated selected relay also opens, at its back contact b, the pickup circuit for the selector relay for the opposing route, as shown for relays ANE and ANW, RE and RW, and BNE and BNW.

In addition, each operated selector relay, by closing its front contact b or c, conditions an exit stick relay XS for operation by the push button for the exit end of its route. Thus relay 6XS is controllable by button 6PB when relay ANE is energized, and relay 8XS is controllable by button 8PB when either relay RE or BNE is energized. Likewise, relay 2XS is controllable by relay 2PBR when either relay ANW or RW is energized, and relay 4XS is controllable by button 4PB when relay BNW is energized.

Under automatic operation, relay APBS is energized and its contacts b and c complete circuits by which a repeating relay AP or BP for the indication storage relay A1 or B1 of the train describer system is energized concurrently with the display of a route indication for route 2—6 or 2—8 by lighting lamp AE or BE. By closing its contacts a and b, relay AP energizes relays ANE and 6XS, or relay BP energizes relays RE and 8XS, with the same effect as when these relays are energized by manual control.

The energization of an exit relay XS closes a circuit in Fig. 1C for a relay NLP or RLP, depending upon whether the switches are to be operated to normal or reverse for the selected route. These relays are identified as lever repeater relays because they may also be operated by moving a normally inactive emergency switch lever 1SW to its respective normal and reverse positions.

When relay NLP is energized, its back contact e interrupts the circuits for relays RE and RW, and when relay RLP is energized, its back contact e interrupts the circuits for relays ANE, ANW, BNE and BNW. In this manner, if two selecting relays ANE and RE or BNW and RW for diverging routes have been energized, the operation of relay NLP by the selected exit relay releases relay RE or RW, while if relay RLP is operated, it releases relay ANE or BNW.

Relays NWS and RWS are switch operating relays which govern the power operation of the track switches 1A and 1B to their respective normal and reverse positions in the conventional manner. These relays are controlled by relays NLP and RLP over front contacts b and c of a switch locking relay LS which is energized only when it is proper to operate the track switches, the control circuit for relay LS including front contacts d of the track relays 1TR and 2TR of Fig. 1A and of an approach locking relay AS, shown in Fig. 1F, for each signal which governs traffic movements over switch 1A or 1B.

The operation of relay NLP or RLP to be effective must be made at a time when relay LS is already energized. Otherwise relay LS is prevented from picking up by the opening of back contact b of relay NLP or RLP.

When the track switches 1A and 1B complete their operation in response to the operation of relay NWS or RWS, a switch correspondence relay NWC or RWC becomes energized and picks up the associated indication relay NWK or RWK, and the latter completes a circuit in Fig. 1D, prepared by the operated exit relay XS, for a route check relay RR which selects the entering signal for the route.

The operated route relay RR, by opening its back contact c in Fig. 1F, releases the approach locking relay AS for the entering signal and this relay in turn releases relay LS in Fig. 1C. Relay LS, by closing its back contact d or e maintains the operated indication relay NWK or RWK energized. If relay NWK is energized, its contact c maintains the circuits for relays RE and RW open, while if relay RWK is energized, its contact c maintains the circuits for relays ANE, ANW, BNE and BNW open. This prevents the selection of any route which conflicts with the one established as long as the switch locking is effective. The opening of contact c of the approach locking relay AS for the entering signal in Fig. 1B prevents the reversal of the traffic direction over an established route.

In addition, relay LS closes its back contact f or g in Fig. 1E to complete a circuit for the mechanism for the entering signal for the selected route, identified by the reference character G prefixed by the designation of the signal, and the operated mechanism G opens its contact a in the circuit for the associated locking relays AS to hold that relay released until the signal is restored to stop.

A route established in this manner may be cancelled manually by momentarily pulling the button PB for the entrance end to open its contact c. This releases successively the operated selecting and exit relays, relay NLP or RLP, the operated relay RR and the operated signal mechanism G.

The closing of back contact a of this mechanism G and of back contact c of the associated route relay RR completes a circuit for a time element relay 1TER or 2TER over a back contact a of the associated approach locking relay AS and a front contact g of the track relay 1TR or 2TR. The time element relay first opens quick acting checking contact c in the signal mechanism circuit and then after a predetermined time locking period closes its timing contact a or b in the circuit for the controlling relay AS, causing that relay to pick up to energize relay LS, and to open the circuit for the time element relay, which then returns to its initial condition in which its checking contact c is closed. Relay LS releases relay NWK or RWK to enable a conflicting route to be established.

When the system is conditioned for manual control, the approach locking relay is reenergized automatically as soon as a train accepts the signal and enters the first section of the route. In each case the operated selecting relay is released by the opening of contact b of the track relay 1TR or 2TR and the selecting relay then releases the operated exit relay XS and also relay NLP or RLP and the operated route relay RR. The signal mechanism G is released concurrently by the opening of contact c of the track relay 1TR or 2TR and the associated approach locking relay AS is picked up at once over back contact e or f of the track relay. The opening of front contact g of the track relay prevents unnecessarily setting the time element relay into operation which otherwise would occur with each train passage.

Although the approach locking relay AS is picked up automatically as a result of the passage of a train while the switch section is occupied, the switch locking relay LS is held released by the open front contact d of the track relay 1TR or 2TR, and relay LS holds relay NWK or RWK energized, so that the switch locking remains effective until the train vacates the switch section.

If the system is conditioned for automatic control, the approach locking relay for the entering signal is not reenergized automatically when a train enters the automatically controllable route 2—6 or 2—8 for the reason that the circuit for the approach locking relay 2AS for that signal which includes contact e of track relay 1TR is held open at back contact e of the changeover relay APBS, and in this case, relay 2AS is reenergized by the operation of the time element relay 1TER at the beginning of a predetermined time locking period which begins when the train vacates the route and the track relay 1TR becomes energized, in the case of route 2—6, or when relays 1TR and 2TR are both energized in the case of route 2—8.

Relays 4AS and 8AS are controlled in a similar manner over back contacts f and g of relay APBS, for the reason that these relays are associated with routes 4—8 and 8—4 which conflict with the automatically establishable routes and which may be set up by manual control when the system is conditioned for automatic operation.

As already mentioned, front contact g of the track relay is included in the circuit for the time element relay to prevent its unnecessary operation when the approach locking relay is picked up automatically over a back contact of the track relay. Under automatic operation these contacts serve a different purpose, which is to insure that the time element relay does not begin operation until the route is fully vacated, and for that reason an additional contact h of the track relay 2TR is required in the circuit for the time element relay 1TER.

The operation of the apparatus of my invention under different assumed conditions will now be described, assuming first that the operator sets up the system for automatic route control of an approaching train and assume that this train is equipped with a marker coil tuned to frequency $f1$.

The operator rotates button 2PB to the right to close its contact d and then presses it momentarily to close its contacts a, b and e. The changeover relay APBS picks up over a circuit from terminal N at contact d of button 2PB in its right-hand position, which circuit includes the winding of relay APBS, contact b of button 2PB, wire 21, front contacts a of relays 2TR, 1TR and 2AR, and extends to terminal B at front contact b of the track relay 12TR. When button 2PB is released, relay APBS is held energized over the stick circuit which extends to terminal N over the right-hand contact d of button 2PB and to terminal B over its own front contact a, front contact c of relay BPBS, wire 22, and front contact b of track relay 12TR.

Relay BPBS is picked up at this time, simultaneously with relay APBS, by operation of the push button 2PB, the energizing circuit being traced from terminal B at push contact e of button 2PB, through the winding of relay BPBS, and over the reverse contact d of button 2PB to terminal N. When relay BPBS picks up, its front contact a establishes a stick circuit for the relay, which circuit may be track from terminal B at back contact b of relay NN, over back contacts b of relays AN and BN in series, over front contact a of relay BPBS, through the winding of relay BPBS, and over reverse contact d of push button 2PB to terminal N.

When the train V passes the reporting device TD1, the train-carried coil effectively couples the primary coil supplied with current of frequency $f1$ to its secondary coil causing the detector relay AD to be momentarily energized.

The closing of contact a of relay AD energizes the directional stick relay 12SR, over front contact c of the track relay 12TR. Relay 12SR is arranged to have an adequate release period, normally several seconds, by the provision of a capacitor of relatively large value connected in parallel with the relay winding. The reporting device TD1 is so placed with reference to the location of the vehicle-carrier marker coil at the time the track relay is shunted due to the passage of the first pair of wheels of the vehicle over the insulated joints at signal 12S that the track relay 12TR will release while relay 12SR is still in its energized position and will complete a stick circuit for relay 12SR which includes its winding and front contact a and back contact c of relay 12TR.

By closing its front contact b, relay 12SR maintains relay APBS energized during the time the train is traversing section 12T.

In the storage unit system, relay L2 is held energized over the stick circuit which includes its own front contact a and the back contacts d of the storage relays of the second storage unit, and when relay AD is operated, relay A2 is picked up by energy supplied over a circuit including contacts b of relays L2 and AD. Relay A2 is held energized over a stick circuit including its own front contact a. It will be noted that the pickup and stick circuits for relay A2 have two connections to terminal B, one over back contact d of relay L1 and the other over back contacts d of relays A1, B1 and N1 in series.

When relay A2 picks up it releases relay L2, and energizes relay L1 over the circuit from terminal N which includes the back contacts c of relays A1, B1 and N1, the winding of relay L1, front contact d of relay A2, back contacts d of relays B2 and N2, and terminal B.

When relay L1 picks up it establishes a stick circuit over its front contact a and completes a pickup circuit for relay A1 which includes front contacts b of relays L1 and A2, and it also opens one branch of the holding circuit for relay A2. Relay A1 picks up and completes a stick circuit at its contact a so that it remains energized. Relay A1 also opens the other branch of the stick circuit for relay A2 so that relay A2 releases, with the result that relay L1 releases and relay L2 is reenergized.

When relay A1 is energized, lamp AE is lighted over contact e of relay A1 to display the indication for route 2—6, and relay AP in Fig. 1B is energized over front contact b of relay APBS, wire 23, and contact b of relay A1.

When relay AP picks up, it energizes relay ANE over the circuit which may be traced from terminal B at front contact b of relay 1TR, front contact a of relay AP, back contact b of relay ANW, the winding of relay ANE, over back contact e of relay RW, wire 26, back contact e of relay RLP, and back contact c of relay RWK to terminal N.

Relay ANE picks up and energizes relay 6XS over the circuit which includes front contact b of relay AP and front contacts c of relays ANE and 6AS. In Fig. 1C, relay NLP is energized over front contact d of relay 6XS and back contact a of relay RLP. Since the track switches 1A and 1B are already in the position required for route 2—6, with relays NWS and NWC energized, relay NWK is energized at once over contact d of relay NLP and contact a of relay NWC. In Fig. 1D, relay 2RR is energized by the closing of front contact b of relay NWK and front contact c of relay 6XS.

In Fig. 1F, the opening of back contact c of relay 2RR releases the approach locking relay 2AS, which, by opening its contact d in Fig. 1C, releases relay LS.

In Fig. 1E, mechanism 2AG is now energized over the route circuit from terminal B over front contacts b of relays 6AS and NWC, back contact f of the switch locking relay LS, the quick acting check contact c of the time element relay 1TER, front contact c of track relay 1TR, back contact b of relay 2AS, front contact a of relay 2RR, front contact c of relay NWC, the winding of the mechanism 2AG for signal 2A, back contact c of relay RWC, and front contact b of relay 2RR to terminal N.

It is to be understood that the indication displaced by the signal changes from stop to proceed or caution, when its mechanism is energized, to authorize a train to enter the established route.

Before tracing the further movement of the train for which the route has been established, it will be assumed that a second train equipped with a marker coil tuned to frequency f2 passes the reporting device TD1 before the first train passes the reporting device TD2.

When the second train passes reporting device TD1, relay BD will be momentarily energized and will energize relays B2 and 12SR, and relay B2 will release relay L2, by operations similar to those already described, and relay 12SR will be effective to maintain relay APBS energized during the passage of the train through section 12T, as in the preceding example.

Since relay A1 is energized, relay L1 is held released and the route indication for the second train is stored by relay B2 of the second unit.

The second reporting device TD2 may be located a short distance in the rear of signal 2A, and it will be assumed that the first train has advanced to a point where its marker coil has passed the device TD2 but that the train has not yet passed signal 2A to shunt the track relay 1TR.

When the marker coil on the first train passes the device TD2, relay AN is momentarily energized and its back contact a interrupts the circuit for supplying energy to the winding of the slow release repeater relay NBP, which after a short time interval releases its contacts. When contact a of relay NBP releases, it opens the stick circuit for relay A1, including front contact a of relay NBP, wire 24a, contact a of the cancellation button CNB, and front contact a of relay A1. Thus relay A1 is released at this time cancelling the indication displayed by the lamp AE and releasing relay AP.

The picking up of relay AN does not affect the supply of energy to the stick circuit of relay BPBS, since front contact f of relay A1 by-passes back contact b of relay AN in the stick circuit of relay BPBS. Moreover, the release of relay NBP closes a further stick circuit for relay BPBS including back contact b of relay NBP, so that when relay A1 releases, relay BPBS is still maintained energized.

When the cancellation relay AN releases, after the passage of the vehicle by the reporting device TD2, the stick circuit for relay BPBS is again completed over the back contacts b of relays AN, BN and NN, and the relay NBP is again energized over the circuit including back contacts a of relays AN, BN and NN. When relay NBP picks up, its front contact a in the stick circuit for storage relays A1, B1 and N1 is again closed, and its back contact b in the stick circuit for relay BPBS is opened.

By closing its back contacts c and d, relay A1 energizes relay L1 over a circuit extending from terminal B, through back contact d of relay N2, front contact d of relay B2, the winding of relay L1 and back contacts c of relays A1, B1 and C1 in series to terminal N and maintains the stick circuit for relay B2 closed after relay L1 picks up. Relay L1 picks up and completes the pickup circuit for relay B1 which includes contacts b of relays B2 and L1 so that relay B1 becomes energized and releases relay B2 which in turn releases relay L1. Relay B1 lights the lamp BE to display the indication for route 2—8 for the second train and also energizes relay BP over wire 24 and contact c of relay APBS.

In Fig. 1B, relays ANE and 6XS remain energized over their respective stick circuits and the established route is not interfered with by the release of relay AP or by the energization of relay BP. Relay RE does not operate on the closing of contact a of relay BP because the connection to therminal N for relay RE over wire 25 is open at contact e of relay NLP and also at contact c of relay NWK, Fig. 1C. Relay 8XS is not operated by relay BP because its circuit, which includes contact b of relay BP, back contact c of relay BNE and front contacts c of relays RE and 8AS, is open at contact c of relay RE.

It will be evident, therefore, that the change in the route indication is without any effect on the established route and that signal 2RA will continue to display its indication. When the first train accepts signal 2A and enters section 1T, the track relay 1TR releases and in turn releases relays ANE, 6XS, NLP and 2RR, and de-energizes mechanism 2AG to put signal 2A to stop.

When the first train vacates route 2—6, relay 1TR picks up and completes a circuit in Fig. 1F for the time element relay 1TER, which circuit may be traced from terminal B over back contact c of relay 2RR, back contacts a of mechanisms 2AG and 2BG, and of relay 2AS, front contact g of relay 1TR, front contact f of relay NWC, and through the winding of relay 1TER to terminal N.

Relay 1TER becomes energized and opens its quick acting contact c in Fig. 1E, and after a predetermined time interval closes its contacts a and b in Fig. 1F, the closing of contact a causing relay 2AS to become energized over a circuit which extends from terminal B, through back contact c of relay 2RR, back contact a of relay 2AG, back contact a of relay 2BG, contact a of relay 1TER and the winding of relay 2AS to terminal N. Relay 2AS will comlete its stick circuit which is the same as the pickup circuit except that it includes front contact a of relay 2AS instead of contact a of relay 1TER. Relay 2AS picking up will open the energizing circuit for relay 1TER at back contact a of relay 2AS and will release relay 1TER. Since relays NLP and RLP are released, relay 2AS energizes relay LS which in turn releases relay NWK. When relay NWK releases, terminal N is again connected to the circuits for relays RE and RW, and if relay BP is energized, relays RE, 8XS and RLP will become successively energized and will find relay LS in its picked-up position; relay RWS will become energized, relays NWS and NWC will release, switches 1A and 1B will assume their reverse position, and relays RWC and RWK will become energized. Relay 2RR will be energized over back contact c of relay 2XS, front contact b of relay RWK, and front contact c of relay 8XS, releasing relay 2AS, which will release relay LS and complete the route circuit in Fig. 1E which extends from terminal B at front contact b of relay 8AS over front contact c of relay 2TR, back contact c of relay 2TER, front contact b of relay RWC, back contact f of relay LS, back contact c of relay 1TER and front contact c of relay 1TR, back contact b of relay 2AS, contact a of relay 2RR, back contact c of relay NWC, the winding of mechanism 2BG, front contact c of relay RWC, and contact b of relay 2RR to terminal N, thereby clearing signal 2B for route 2—8.

The locking of the track switches by the time locking means is effective to prevent their operation as long as there is a train in any route which conflicts with the one which is established automatically by the operation of relay AP or BP by the train describer system, even though a track relay is imperfectly shunted during the passage of the train.

The establishment of route 2—8, as described above, is prevented during the passage of a train over route 2—6 because relay 2AS is held released by the opening of back contact d of relay APBS until contact a of relay 1TER closes at the end of a time locking period which begins when front contact g of relay 1TR closes.

Similarly, the establishment of route 2—6 automatically during the passage of a train over route 2—8 is prevented until the end of the time locking period which begins when the train vacates the last section 2T of the route and closes contact h of relay 2TR, which is this case is included in series with contact g of relay 1TR because contact f of relay NWC and contact d of relay APBS are both open.

When a route is conditioned for automatic operation, route 4—8 or 8—4 may be set up manually by operation of push buttons 4PB and 8PB, provided route 2—8 has not already been established to open contact c of relay RWK in the circuits for the selecting relays BNE and BNW. The establishment of route 2—8, but not of route 2—6, is prevented during the passage of a train over route 4—8 or 8—4 because relay LS is held deenergized by the release of relay 4AS or 8AS, and the latter relay is held released by the opening of back contact f or g of relay APBS until contact a or b of relay 2TER closes at the end of a time locking period which begins when front contact g of relay 2TR closes.

A back contact of relay APBS is not included in the circuit for relay 6AS because this relay is released only when route 6—2 is set up, and neither this route nor route 8—2 can be set up when the system is conditioned for automatic operation.

An important condition to be considered is when two successive trains have the same route. In this case relay AP or BP is released when the first train passes the second reporting device TD2 and the same relay is then reenergized by the route indication for the second train. The route selecting relay ANE or RE is released by the track relay 1TR and is reenergized by this relay when the first train vacates section 1T, so that signal 2A or 2B for the same route will clear for the second train as soon as the first train passes out of the block, which may be assumed to include one or more sections in advance of the switch sections, the circuits for which are not shown. No time delay is imposed as when the route for the second train is different from that for the first train, the switch locking remaining in effect in this case.

It will next be assumed that the system is conditioned for automatic operation, with relays APBS and BPBS energized, that route 2—6 or 2—8 has been set up and signal 2A or 2B cleared for an approaching train by the operation of relay AP or BP, and that a following train which is equipped with a marker coil tuned to frequency f3 enters the approach zone. On passing the reporting device TD1, relay ND will be operated to energize relay N2 which will store the indication until conditions permit its transfer to relay N1. The directional stick relay 12SR will not be operated and in consequence the change-over relay APBS will be released by the track relay 12TR, thereby releasing relay AP or BP. When the first train enters the route, relay 2AS is picked up by the release of the track relay 1TR, and its switch locking is released as soon as the train vacates the route.

In the event the second train is not equipped with a marker coil, and the train reporting device is not actuated, the approach of the train is detected by the release of the track relay 12TR and relay APBS is released with the same effect as in the preceding example.

In either case, the operator will place contact d in its left-hand position and manually set up the route for the second train.

It will now be assumed that, with the apparatus conditioned for automatic operation, a first and a second train consecutively enter the approach zone, carrying coils tuned to frequencies f1 and f2, respectively. The identification will be stored, in the manner previously described, by relay A1 for the first train and by relay B2 for the second train, and the route 2—6 will be lined up for the first train, all in accordance with the operation described heretofore. Now let it be assumed that, as a result of an open circuit or other defect, the first train fails to operate relay AN when the first train passes the second set of train identification apparatus TD2, but continues on through route 2—6 and clears the interlocking. The apparatus will function as previously described to release the route selection relays, establish the switch locking, and return signal 2A to stop.

Relay A1 in the storage system will remain picked up, and thereby prevent the transfer of the identity of the second train from relay B2 to relay B1. When the first train vacates section 1T, track relay 1TR will pick up to reestablish the route selection circuits for route 2—6, since relay AP will still be picked up. Accordingly, signal 2A will be recleared for route 2—6, which does not correspond to the correct route 2—8 which the second train should take.

When the second train passes the reporting point TD2, relay BN will be operated momentarily. When contact b of relay BN picks up, the stick circuit for relay BPBS will be opened, since the by-pass circuit is already open at contact f of relay B1, which could not be energized due to relay A1 remaining incorrectly energized.

Since relay NBP is slow in releasing, the stick circuit for relay BPBS including back contact b of relay NBP will be open at this time, and, as a result, relay BPBS will release, further opening its stick circuit at its front contact a.

The release of contact c of relay BPBS interrupts the stick circuit for relay APBS, which releases to further interrupt its stick circuit at its front contact a. Release of contacts b and c of relay APBS will open the circuits for relays AP and BP, so that no further route identification can operate the route selection relays.

With contact b of relay BPBS released and contact d of push button 2PB closed, an obvious circuit is established for energizing the marker light control relay 2CHR, Fig. 1B. With relay 2CHR picked up, a circuit including front contact a of relay 2CHR supplies energy to a special marker lamp 2C, Fig. 1E, on the mast for signals 2A and 2B. This marker lamp will call the attention of the engineman on the second train to the fact that the signals displayed and the route established for his train are not in accordance with the identity of his train as established by the vehicle-carried coil.

The release of relays APBS and BPBS reverts the interlocking system from automatic to manual control. The operator, after communicating with the engineman on the second train, may then establish the correct route for the second train by pushing buttons 2PB and 8PB to line up route 2—8, which is the correct route for the second train, assuming first that sufficient time has elapsed to permit the time element relay 1TER to operate and cause relay 2AS to become reenergized.

Inspection of the stick circuit for relay BPBS will show that a correspondence check is made between each of the cancellation relays AN, BN and NN and the associated storage relays A1, B1 and N1, so that, if the operation of these relays is not in correspondence, the relay BPBS will be released. Thus the identity of each train entering the interlocking is checked against the identity used by the storage system for establishing the route, and if the identities do not correspond, the system is reverted to manual control and a suitable warning is provided for the engineman of a following train that the proper route for his train has not been established.

Any suitable type of warning signal may be provided to warn the interlocking operator that the system is not operating properly. For example, a lamp such as lamp YE, Fig. 1B, can be controlled over a contact d of relay BPBS to show that the system is in proper condition to route trains automatically.

Although I have herein shown and described only one embodiment of my invention, it is to be understood that various changes and modifications may be made therein within the scope of the appended claims without departing from the spirit and scope of my invention.

Having thus described my invention, what I claim is:

1. In an automatic route control system for railroads, a manually controllable interlocking control system for establishing routes for trains approaching an interlocking, a first train reporting device located at the entrance to an approach zone of track leading to said interlocking, a train describer system for supplying indications of the routes for approaching trains in the order of their approach as determined by said first train reporting device, a changeover relay which is released when said interlocking control system is conditioned for manual operation and which when energized conditions said interlocking control system to automatically establish traffic routes in accordance with the indications supplied by said train describer system, manually operable means for energizing said changeover relay, a second train reporting device located at the exit end of said approach zone, and means for maintaining said changeover relay energized only when the identities of trains supplied by said train describer system correspond with the identities of trains determined by said second train reporting device.

2. In an automatic route control system for railroads, a manually controllable interlocking control system for establishing routes for trains approaching an interlocking, a first train reporting device located at the entrance to an approach zone of track leading to said interlocking, a train describer system for supplying indications of the routes for approaching trains in the order of their approach as determined by said first train reporting device, manual changeover means which in a first position conditions said interlocking control system for manual control and in a second position enables it to be conditioned for automatic control by said train describer system, a changeover relay having pickup and stick circuits including a contact closed by said manual changeover means in its second position, said pickup circuit including a normally open manually operable contact and contacts which when closed indicate that there is no train occupying the routes indicated by the train describer system, a second train reporting device located at the exit end of said approach zone, means governed by said train describer system and said second train reporting device for maintaining the stick circuit for said changeover relay as long as the identities of trains supplied by said train describer system correspond with the identities of trains determined by said second train reporting device, and means effective when said changeover relay is energized for conditioning said interlocking control system to automatically establish traffic routes in accordance with the indications supplied by said train describer system.

3. In an automatic route control system for a stretch of railway track including an interlocking plant and an adjoining approach zone, a train describer system for registering indications of the routes for trains entering said approach zone, a manually controllable interlocking control system for establishing routes for such trains through said interlocking plant, a changeover relay which is released when said interlocking system is conditioned for manual operation and which when energized conditions said interlocking control system to automatically establish traffic routes in accordance with the indications registered by said train describer system, manually operable means for energizing said changeover relay, a train reporting device for identifying the routes of trains as they approach the exit of said approach zone, and stick circuit means for maintaining said changeover relay energized only as long as the route identifications supplied by said train describer system correspond with the route identifications supplied by said train reporting device.

4. In an automatic route control system for a stretch of railway track including an interlocking plant and an adjoining approach zone, a train describer system for registering indications of the routes for trains entering said approach zone, a manually controllable interlocking control system for establishing routes for such trains through said interlocking plant, a changeover relay which is released when said interlocking system is conditioned for manual operation and which when energized conditions said interlocking control system to automatically establish traffic routes in accordance with the indications registered by said train describer systems, pickup and stick circuits for said changeover relay, said pickup circuit including a normally open manually operable contact, a train reporting device located at the exit end of said approach zone for providing indications of routes of trains leaving said approach zone, and correspondence checking means for determining the correspondence or non-correspondence of the route indications supplied from said train describer system and said train reporting device, said correspondence checking means governing said stick circuit of said changeover relay.

5. In an automatic route control system for a stretch of railway track including an interlocking plant and an adjoining approach zone, a train describer system for registering indications of the routes of trains entering said approach zone, a manually controllable interlocking control system for establishing routes for such trains through said interlocking plant, a first auxiliary relay which is released when said interlocking system is conditioned for manual operation and which when energized conditions said interlocking control system to automatically establish traffic routes in accordance with the indications registered by said train describer system, pickup and stick circuits for said first auxiliary relay, said pickup circuit for said first auxiliary relay including a normally open manually operable contact, a train reporting device located at the exit end of said approach zone for providing indications of routes of trains leaving said approach zone, a second auxiliary relay, a pickup circuit for said second auxiliary relay including a normally open manually operable contact, and a stick circuit for said second auxiliary relay governed by said train describer system and said train reporting device whereby said second auxiliary relay is maintained energized only as long as the indications registered by said train describer system correspond to the indications provided by said train reporting devices, said stick circuit for said first auxiliary relay being governed by said second auxiliary relay.

6. In an automatic route control system for a stretch of railway track including an interlocking plant and an adjoining approach zone, a train describer system for registering indications of the routes of trains entering said approach zone, a manually controllable interlocking control system for establishing routes for such trains through said interlocking plant, a first auxiliary relay which is released when said interlocking system is conditioned for manual operation and which when energized conditions said interlocking control system to automatically establish traffic routes in accordance with the indications registered by said train describer system, pickup and stick circuits for said first auxiliary relay, said pickup circuit for said first auxiliary relay including a normally open manually operable contact, a train reporting device located at the exit end of said approach zone for providing indications of routes of trains leaving said approach zone, a second auxiliary relay, a pickup circuit for said second auxiliary relay including a normally open manually operable contact, a stick circuit for said second auxiliary relay governed by said train describer system and said train reporting device whereby said second auxiliary relay is maintained energized only as long as the indications registered by said train described system correspond to the indications provided by said train reporting devices, said stick circuit for said first auxiliary relay being governed by said second auxiliary relay, a wayside signal located at the exit end of said approach zone and governed by said interlocking control system, and means governed by said second auxiliary relay for displaying a special aspect on said wayside signal.

7. In an automatic route control system for railroads, an interlocking for diverting traffic over various routes, a train describer system for registering indications of the routes for trains approaching said interlocking in the order of their approach, an interlocking control system of the type having push buttons for the ends of interlocked traffic routes by means of which such routes may be manually established, means comprising a rotatable contact associated with the push button for the entrance end of the routes indicated by said train describer system, said contact having a first position in which said push button is conditioned for the manual control of such routes and a second position in which the momentary operation of the push button associated therewith conditions the inerlocking control system to automatically establish traffic routes in accordance with the indications supplied by said train describer system, a train reporting device for registering indications of the routes of trains and located adjacent the entrance of said interlocking for said routes, and means for terminating the automatic control of said traffic routes by said train describer system if the route indicated by the train describer system does not correspond with the route indicated by said train reporting device.

8. In an automatic route control system for railroads, an interlocking for diverting traffic over various routes, a train describer system for registering indications of the routes for trains approaching said interlocking in the order of their approach, an interlocking control system of the type having push buttons for the ends of interlocked traffic routes by means of which such routes may be manually established, means comprising a rotatable contact associated with the push button for the entrance end of the routes indicated by said train describer system, said contact having a first position in which said push button is conditioned for the manual control of such routes and a second position in which the monetary operation of the push button associated therewith conditions the interlocking control system to automatically establish traffic routes in accordance with the indications supplied by said train describer system, a train reporting device for registering indications of the routes of trains and located adjacent the entrance of said interlocking for said routes, means for terminating the automatic control of said traffic routes by said train describer system if the route indicated by the train describer system does not correspond with the route indicated by said train reporting device, and wayside signal means for indicating when correspondence does not exist between the train describer system and the train reporting device.

References Cited in the file of this patent

UNITED STATES PATENTS

| | | |
|---|---|---|
| 2,122,358 | Preston | June 28, 1938 |
| 2,206,550 | Mordin | July 2, 1940 |
| 2,255,142 | Wight | Sept. 9, 1941 |
| 2,520,838 | Hays | Aug. 29, 1950 |
| 2,656,455 | Van Tassel | Oct. 20, 1953 |
| 2,670,434 | Groenendale | Feb. 23, 1954 |
| 2,700,728 | Brixner et al. | Jan. 25, 1955 |